(12) United States Patent
Nagai

(10) Patent No.: US 7,561,362 B2
(45) Date of Patent: Jul. 14, 2009

(54) MAGNETIC HEAD HAVING TRACK WIDTH EXPANSION MECHANISM, MAGNETIC STORAGE DEVICE AND CONTROL CIRCUIT

(75) Inventor: Makoto Nagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/001,008

(22) Filed: Dec. 7, 2007

(65) Prior Publication Data

US 2009/0034111 A1 Feb. 5, 2009

(30) Foreign Application Priority Data

Aug. 1, 2007 (JP) .............................. 2007-200949

(51) Int. Cl.
*G11B 5/02* (2006.01)

(52) U.S. Cl. ..................................................... 360/59

(58) Field of Classification Search .................. 360/75, 360/77.04, 6, 25, 128, 125.33, 234.6, 234.4, 360/59
See application file for complete search history.

(56) References Cited

U.S. PATENT DOCUMENTS

| | | | | |
|---|---|---|---|---|
| 5,936,806 A | * | 8/1999 | Pan et al. | 360/234.6 |
| 5,991,113 A | * | 11/1999 | Meyer et al. | 360/75 |
| 6,937,419 B2 | * | 8/2005 | Suk et al. | 360/75 |
| 6,956,707 B2 | * | 10/2005 | Ottesen et al. | 360/25 |
| 7,027,263 B2 | * | 4/2006 | Ottesen et al. | 360/234.4 |
| 7,336,434 B2 | * | 2/2008 | Lille et al. | 360/6 |
| 7,372,665 B1 | * | 5/2008 | Stoev et al. | 360/125.33 |
| 7,428,124 B1 | * | 9/2008 | Song et al. | 360/128 |
| 2004/0228022 A1 | | 11/2004 | Ueyanagi | |
| 2008/0186619 A1 | * | 8/2008 | Yamazaki | 360/77.04 |
| 2008/0225427 A1 | * | 9/2008 | Liu | 360/75 |

FOREIGN PATENT DOCUMENTS

JP 2004-253055 9/2004

* cited by examiner

*Primary Examiner*—Fred Tzeng
(74) *Attorney, Agent, or Firm*—Greer, Burns & Crain, Ltd.

(57) ABSTRACT

The present invention generally relates to a magnetic head and a magnetic storage device using a recording medium. More particularly, the present invention relates to a magnetic head for expanding the track width of the recording medium, a control circuit for controlling the magnetic head, and a storage device that uses the magnetic head and the control circuit. The magnetic head includes a slider, a read element disposed on the slider, and a heater element disposed closer to the leading edge side of the magnetic head than the read element in a position opposite to a recording medium.

6 Claims, 3 Drawing Sheets the cross track direction

MAGNETIC HEAD HAVING TRACK WIDTH EXPANSION MECHANISM, MAGNETIC STORAGE DEVICE AND CONTROL CIRCUIT

BACKGROUND OF THE INVENTION

1. Field of the Invention

The present invention generally relates to a magnetic head and a magnetic storage device using a recording medium. More particularly, the present invention relates to a magnetic head for expanding the track width of the recording medium, a control circuit for controlling the magnetic head, and a storage device that uses the magnetic head and the control circuit.

2. Description of the Related Art

The development of magnetic storage devices, including a hard disk drive (HDD), is being advanced to achieve higher recording densities, and their recording density is increasing at an annual rate of 30 to 100%. In HDDs being mass-produced, there has already been realized an areal recording density of 100 Gb/in$^2$.

Note here that the areal recording density of a magnetic storage device is determined by the product of bits per inch (BPI) and tracks per inch (TPI). In other words, the recording density is determined by the product of BPI denoting bit density in the track direction of a recording medium and TPI denoting bit density in the cross-track direction thereof. BPI is mainly dominated by the amount of noise in the magnetization reversal region of a recording medium. Accordingly, development efforts are being made to reduce the noise of the recording media, so as to be able to increase the density of BPI. Specifically, the development efforts are being made to reduce a residual magnetization-thickness product and increase coercivity since it is well known that the amount of noise in a recording medium is proportional to the residual magnetization-thickness product and is inversely proportional to the coercivity. Note here that although the amount of noise decreases as the residual magnetization-thickness product is reduced, there arises the problem that read signal output becomes smaller. In connection with this problem, the techniques called CPP-GMR (Current Perpendicular to Plane Giant Magneto Resistance) and TuMR (Tunneling Magneto Resistance) that overwhelmingly surpass the magneto-resistive effect rate of GMR (Giant Magneto Resistance), which is the related art, have already been employed in magnetic heads for mass-production since it is effective to increase the magneto-resistive effect rate of a read element of the magnetic head.

In addition, with regard to the increase of coercivity, there is the constraint that it is only possible to increase coercivity to the extent of causing magnetization reversal at the write magnetic field of a write element of the magnetic head. With regard to the write magnetic field intensity of a write element portion, a magnetic material having a magnetic flux density of 2.45 T, which is considered as a physical limit, has already been employed in magnetic heads for mass-production and, therefore, it is difficult to further increase the write magnetic field intensity. Note that failure to fully reverse magnetization at the write magnetic field of the write element is undesirable since magnetic crystal grains, the magnetization of which has not been reversed, serve as a noise source. In connection with this problem, there has been proposed a method wherein a heat source, such as a laser, is disposed in a magnetic head or in a head slider whereon the magnetic head is mounted, in order to radiate laser light at a recording medium when writing (recording) thereto, thereby temporarily decreasing the coercivity of the recording medium. Use of this mechanism makes it possible to attain large coercivity without being obliged to adhere to the write magnetic field intensity of the write head element portion. In this way, the densification of BPI has been achieved by a variety of technical approaches.

On the other hand, it is difficult to control TPI for reasons of the characteristics of the recording media and, therefore, the densification has been attempted by reducing the widths of the read and write elements of the magnetic head in the cross-track direction thereof, i.e., so-called core widths. The core width of the write element is designed to be larger than that of the read element so that the read head element does not sense the track edge noise of the recording medium. For this reason, the machining accuracy of the read element is required to be higher than that of the write element. Note here that the core width of the read element was as extremely large as approximately 2 μm for an areal recording density of 2 Gb/in$^2$, whereas it is now as extremely small as approximately 100 nm for an areal recording density of 100 Gb/in$^2$. A decrease in the core width means that tolerances for the dimensions of core width become even more stringent. Whereas the core width and tolerance of write elements for an areal recording density of approximately 100 Gb/in$^2$ currently in mass-production is approximately 185±50 nm, the core width and tolerance of the read element is required to satisfy machining accuracy as extremely stringent as approximately 100±10 nm. The read and write elements of the magnetic head are fabricated after being subjected to a series of complex processes wherein a process based on a photolithography technique for machining the elements into desired shapes, a plating process for depositing metal films, a sputtering process, and a polish process based on chemical mechanical polish (CMP) are repeated over and over again. For this reason, it becomes more difficult to make the magnetic head fall within the specified tolerances thereof in a manufacturing process as the core width becomes narrower. Although the degradation of read signal output is caused if the read element core width is narrower than the tolerable limit thereof, there is no major problem as long as CPP-GMR or TuMR elements having extremely high magneto-resistive effect rates are used. If the core width is wider than the tolerable limit thereof, however, there arises the problem that the read element senses track edge noise. It is therefore an object of the present invention to solve the problem of preventing track edge noise from being sensed even if the core width of the read element of the magnetic head is wider than the tolerable limit thereof. It is another object of the present invention to provide a control circuit for controlling the magnetic head.

SUMMARY

In accordance with an aspect of embodiment, a magnetic head includes a slider, a read element disposed on the slider, and a heater element disposed closer to the leading edge side of the magnetic head than the read element in a position opposite to a recording medium.

DETAILED DESCRIPTION OF THE EMBODIMENTS

Figure 1:
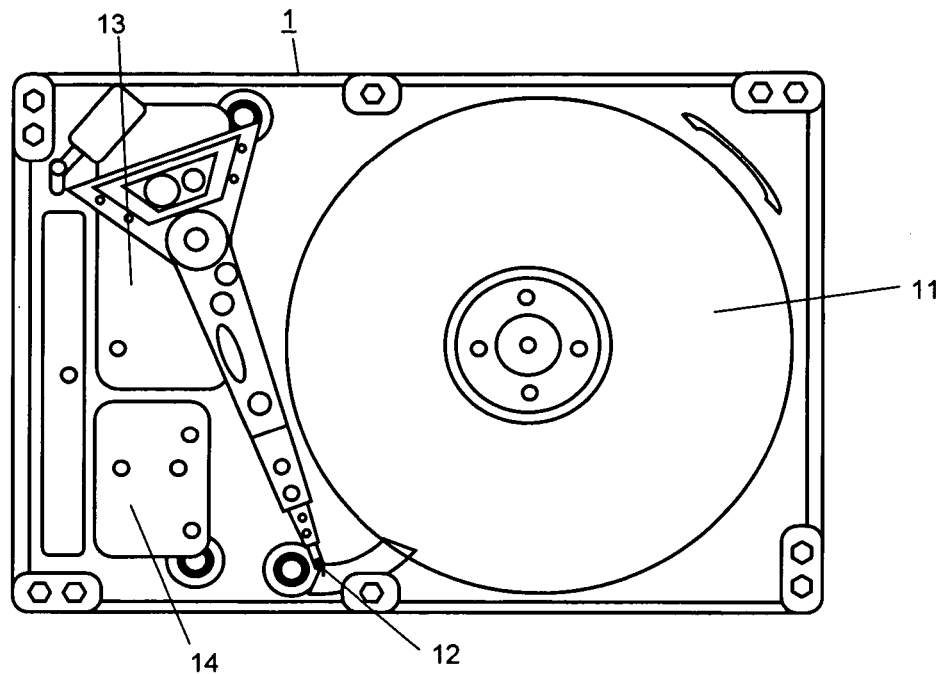
FIG. 1 is a schematic view illustrating the inside of a common magnetic storage device for which the magnetic head of an embodiment of the present invention is used.
Figure 2:
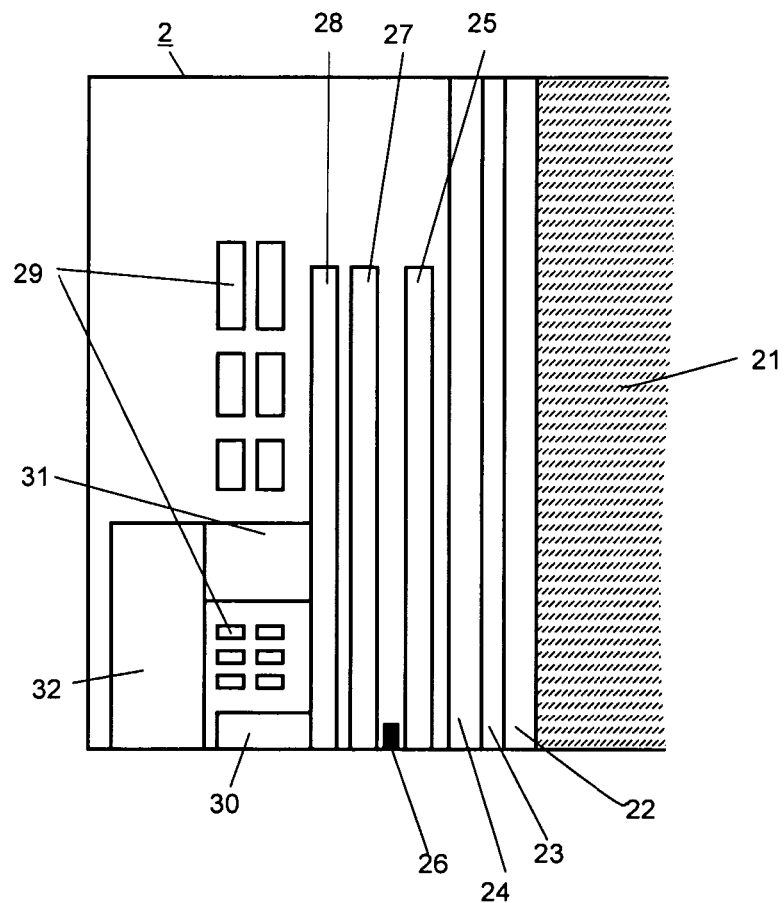
FIG. 2 is a schematic view illustrating a cross-section of the magnetic head of the embodiment.
Figure 3:
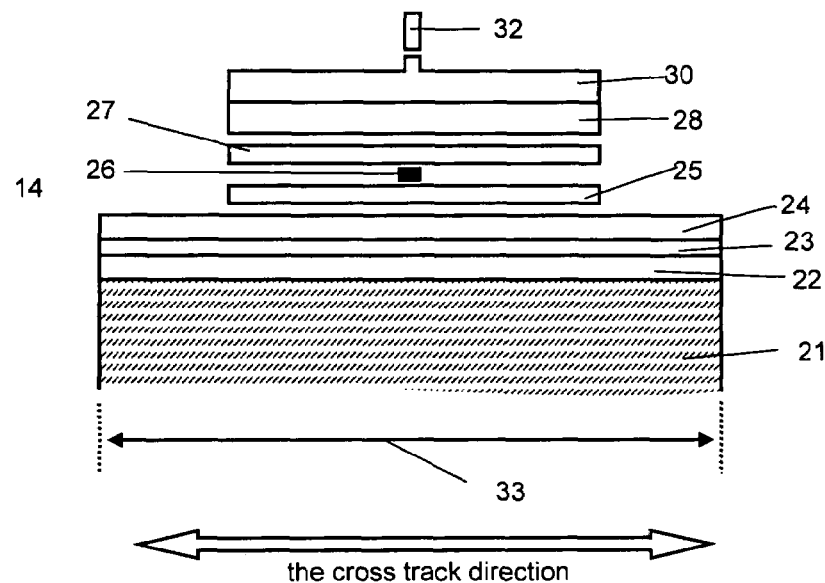
FIG. 3 is a schematic view illustrating another cross-section of the magnetic head of the embodiment.

Hereinafter, an embodiment of the present invention will be described with reference to FIGS. 1 to 6. FIG. 1 is a schematic view illustrating the inside of a common magnetic storage device for which the magnetic head of an embodiment of the present invention is used. Inside a magnetic storage device 1, there are equipped a magnetic disk 11 serving as a recording medium, a head slider 12 whereon a magnetic head is mounted, a head amplifier IC 13 responsible for controlling read/write signals, a read/write channel LSI 14, and the like. FIG. 2 is a schematic view illustrating a cross-section of the magnetic head of the present embodiment. FIG. 3 is a schematic view illustrating the ABS surface, i.e., the air bearing surface of the magnetic head of the present embodiment. A low-thermal expansion layer 22 made of Ta or B is formed on an Al—Ti—C substrate 21 serving as the head slider and made of $Al_2O_3$—Ti—C, using, for example, a plating process to a thickness of approximately 5 µm. Next, a heater element 23 made of, for example, a Cu thin film is formed using a plating process to a thickness of approximately 3 µm. At this point, though not shown in the figure, a pair of electrodes is formed in the heater element 23. Note that as the heater element, a semiconductor laser, such as a GaAlAs laser, may be used rather than the Cu thin film. Then, the low-thermal expansion layer 22 is once again formed using a plating process to a thickness of approximately 5 µm. As a result, it is possible to suppress the propagation of heat generated from the heater element 23. In other words, it is possible to suppress the thermal damage of the read and write elements due to heat propagation from the heater element and the expansion of the head slider whereon the magnetic head is mounted. Note here that in FIG. 2, the widths of the low-thermal expansion layers 22 and 24 and the heater element 23 are defined as 0.7 mm, the same as the width 33 of the head slider. As described above, it is possible to heat the tracks of the recording medium even if a skew angle is given, by forming the low-thermal expansion layers 22 and 24 and the heater element 23 so as to extend in the cross-track direction.

Next, an alumina insulating layer made of $Al_2O_3$, though not shown in the figure, is formed to a thickness of approximately 0.3 µm. Then, on the alumina insulating layer, there is formed an approximately 2.0 µm-thick lower magnetic shield layer 25 made of, for example, an Ni—Fe alloy, intended to alleviate the effect of unnecessary read signals from the recording medium, using a common plating process. Then, a read element 26 having a GMR, CPP-GMR or TuMR magneto-resistive effect is formed using a common sputtering process so that the width (refers to a read core width) thereof equals 100 nm. Then, an approximately 1.5 µm-thick upper magnetic shield layer 27 made of, for example, an Ni—Fe alloy is formed. Note that an interspatial part between the lower magnetic shield layer 25 and the upper magnetic shield layer 27 is assumed to be covered with alumina, though not shown in the figure.

Next, an insulating layer made of alumina is formed on the upper magnetic shield layer 27 to a thickness of 0.26 µm. Then, a write element is formed. The write element is formed by forming an approximately 1.0 µm-thick first lower magnetic pole layer 28, an approximately 4.3 µm-thick second lower magnetic pole layer 30, an approximately 5.0 µm-thick joint part 31, approximately 1.8 µm-thick thin film coil portions 29, and an approximately 5.0 µm-thick upper magnetic pole layer 32, using a common plating process. Note that it is possible to use a common photolithography or CMP technique to machine the write element into a desired shape. In addition, it should be assumed that spatial parts, such as gaps between the thin film coil portions 29, between the second lower magnetic pole layer 30 and the upper magnetic pole layer 32 are covered with alumina, though not shown in the figure. In other words, it should be assumed that spatial parts in the entirety of FIG. 2 are covered with alumina.

Figure 4:
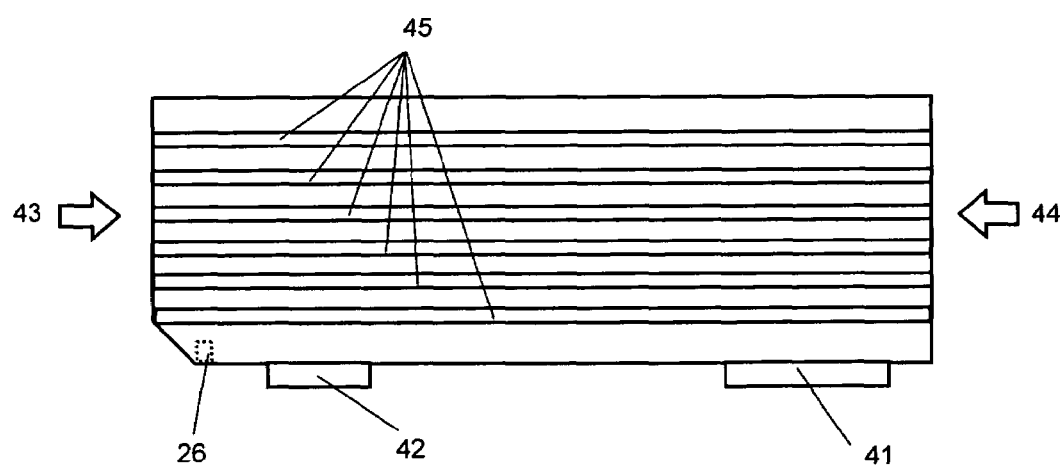
FIG. 4 is a schematic view illustrating a lateral side of the magnetic head of the embodiment.

FIG. 4 is a schematic view illustrating a lateral side of the magnetic head of the embodiment. On the lateral side of the magnetic head's head slider, there are formed trenches as heat sinks 45 using, for example, a focused ion beam (FIB) process or a damascene process, so that both the width and depth thereof are approximately 100 µm and the trenches are virtually parallel with the length direction of the head slider. By forming heat sinks 45 in this way, it is possible to cool down the head slider heated by the heater element by means of airflow when air flows from a leading edge 44 to a trailing edge 43 at the time of flying, without increasing air resistance. In addition, the head slider is provided with a front rail 41 and a rear rail 42. By forming the low-thermal expansion layer 22 along with the heat sinks 45 as described above, the issue of heat propagation caused by the heater element 23 becomes ignorable. In other words, it is possible to prevent the magnetic head and the recording medium from coming into contact with each other due to the thermal expansion of the head slider and thus becoming damaged.

Figure 5:
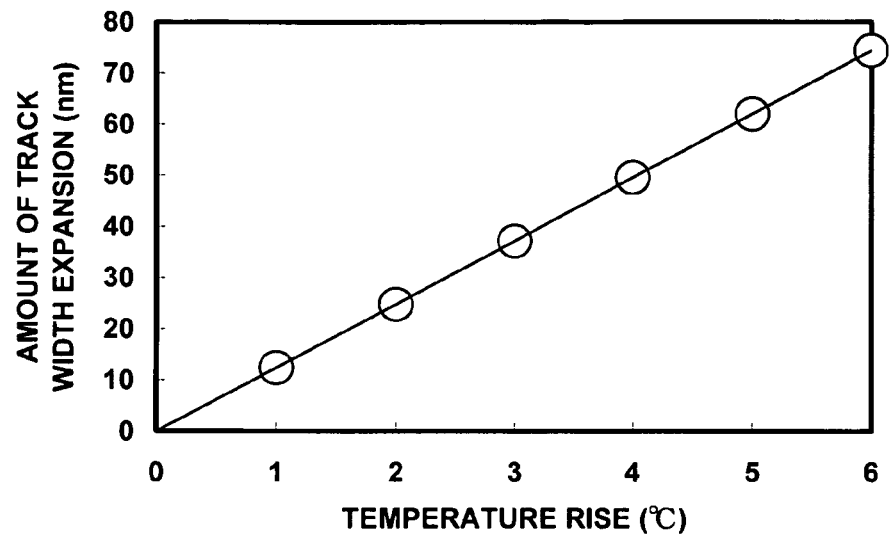
FIG. 5 is a graphical representation illustrating the relationship between the temperature of tracks raised by a heater element and the amount of track width expansion.

FIG. 5 is a graphical representation illustrating the relationship between the temperature of track of the recording medium 11 raised by the heater element 23 and the amount of track width expansion of the recording medium 11. Simulations performed by the inventor of the present invention have revealed that the track width of the recording medium expands by 12.4 nm as the track temperature rises by 1° C. It is therefore only necessary to expand the track width of the recording medium 11 by the heater element 23 in accordance with the core width of the read element by taking advantage of this value. The core width of the read element can be measured using either an optical method wherein a scanning electron microscope (SEM) is used or a micro-track method wherein the core width is calculated from track profiles of the recording medium. Note that the measurement of the read element's core width based on the micro-track method may be performed using a head tester before assembling the magnetic head into the magnetic storage device 1, or may be performed by calculation from track profiles of the recording medium 11 within the magnetic storage device 1 after assembling the magnetic head into the magnetic storage device 1. If the measured core width is, for example, 130 nm for a standard core width value of 100 nm, it is only necessary to raise the track of the recording medium temperature by 2.4° C. by heating the track of the recording medium with the heater element at the time of read operation. Also note that it is necessary to previously quantify the relationship between the thermal dose of the heater element 23 and the rise of track temperature using a temperature sensor, such as a thermocouple. As described above, in the embodiment of the present invention, the track width of the recording medium is expanded by instantaneously heating the tracks of the recording medium using a pulse voltage at the time of read operation for detecting read signals. At this point, it is possible to save electric power by controlling the thermal dose according to the dimensions of the core width.

Figure 6:
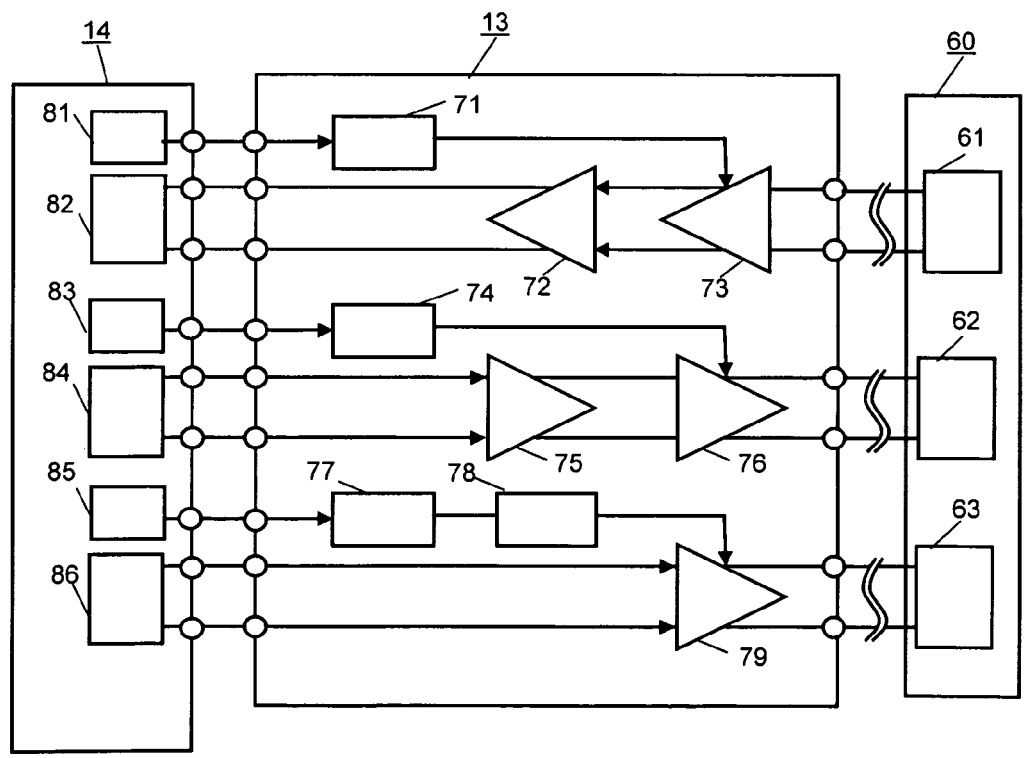
FIG. 6 is a block diagram illustrating a control circuit for controlling the magnetic head of the embodiment.

FIG. 6 is a block diagram illustrating a control circuit for controlling the magnetic head of the embodiment. First, a read power supply 71 for controlling the read element, a read data buffer 72, a read amplifier 73, a write power supply 74 for controlling the write element, a write data buffer 75, and a write driver 76 are equipped in a head amplifier IC 13, in order to perform normal read/write processing. Note that the read terminal portion 61 of the read element of a magnetic head 60 is connected to the read amplifier 73 and the write terminal portion 62 of the write element is connected to the write driver 76. At this point, the head amplifier IC 13 is further equipped with a heater element power supply 77 and a heater element driver 79. By connecting a pulse modulation circuit 78 to the heater element power supply 77, it is possible to instantaneously heat the heater element 23. Note that the heater element driver 79 is connected to a heater element terminal portion 63.

The decoder unit 82 of the read/write channel LSI 14 has the function of decoding read data received from the read data buffer 72. Read operation is performed by amplifying a read signal from the recording medium by the read amplifier 73 and transmitting data to the read/write channel LSI 14 via the read data buffer 72. Note that power to the read terminal portion 61 is applied from a read voltage regulator 81 via the read power supply 71. Write operation is performed in such a manner that an encoder unit 84 encodes write data and transmits the encoded write data to a write data buffer 75 so that a write magnetic field is applied from the write element through the write driver 76 and the write terminal portion 62 to the recording medium. Note that power to the write terminal portion 62 is applied from a write voltage regulator 83 through the write power supply 74. Also note that the decoder unit 82 and the encoder unit 84 are connected to a waveform equalizing FIR filter, a Viterbi decoder, and the like, though not shown in the figure. In addition, a heater element voltage regulator 85 is disposed in the read/write channel LSI 14. The heater element voltage regulator 85 has the same function as those of the aforementioned read voltage regulator 81 and the write voltage regulator 83.

Note here that a heater element control circuit 86 is further disposed in the read/write channel LSI 14. A memory is equipped in the heater element control circuit 86 to store the value of the read element's core width measured using the above-described methods and the relationship between the thermal dose of the heater element 23 and the amount of track temperature rise. The heater element control circuit 86 initiates read operation and puts the heater element driver 79 into operation to expand the track width. Note that the heater element control circuit 86 may be disposed within the head amplifier IC 13 or may be disposed independently so as to intermediate between the read/write channel LSI 14 and the head amplifier IC 13.

According to the configurations of the magnetic head and the control circuit of the present embodiment, read element does not involve the detection of track edge noise. In addition, by using low-thermal expansion materials and heat sinks, it is possible to prevent thermal damage to the read element and the write element due to heat propagation caused by the heater element and the expansion of the head slider. Accordingly, it is possible to provide a magnetic storage device having high HDI reliability.

It should be noted that the magnetic head in accordance with the foregoing embodiment of the present invention is applicable to magnetic heads in a variety of forms, including magnetic heads for perpendicular magnetic recording and magneto-optical recording, in addition to a magnetic head for in-plane magnetic recording.

What is claimed is:

1. A magnetic head comprising:
   a slider;
   a read element disposed on the slider;
   a heater element disposed closer to the leading edge side of the magnetic head than the read element in a position opposite to a recording medium; and
   wherein the heater element is directly sandwiched by low-thermal materials having thermal expansion coefficients smaller than that of the slider.

2. The magnetic head according to claim 1, wherein heat sinks are formed on the surface of the slider.

3. The magnetic head according to claim 1, wherein the heater element expands in the cross-track direction of the recording medium.

4. A magnetic storage device comprising:
   a magnetic head provided with a heater element disposed closer to the leading edge side of the magnetic head than a read element in a position opposite to a recording medium;
   a recording medium; and
   wherein the heater element causes the track width of the recording medium to expand in accordance with the core width of the read element at the time of read operation.

5. A control circuit comprising:
   a heater element control circuit for controlling the amount of heat generated by a heater element causes the track width of the recording medium to expand in accordance with the core width of a read element; and
   a heater element driver for heating the heater element at the time of read operation.

6. The control circuit according to claim 5, wherein the heater element driver further comprises a pulse modulation circuit.

* * * * *